United States Patent
Etemad et al.

(10) Patent No.: US 9,955,481 B2
(45) Date of Patent: Apr. 24, 2018

(54) OPPORTUNISTIC CARRIER AGGREGATION USING SHORT RANGE EXTENSION CARRIERS

(71) Applicant: Intel Corporation, Santa Clara, CA (US)

(72) Inventors: Kamran Etemad, Potomac, MD (US); Christian Mucke, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 15/065,981

(22) Filed: Mar. 10, 2016

(65) Prior Publication Data

US 2017/0006607 A1 Jan. 5, 2017

Related U.S. Application Data

(63) Continuation of application No. 13/991,712, filed as application No. PCT/US2011/065628 on Dec. 16, 2011, now Pat. No. 9,288,742.

(Continued)

(51) Int. Cl.
*H04W 72/04* (2009.01)
*H04B 7/0456* (2017.01)
(Continued)

(52) U.S. Cl.
CPC ...... *H04W 72/0453* (2013.01); *H04B 7/0456* (2013.01); *H04B 7/0486* (2013.01);
(Continued)

(58) Field of Classification Search
CPC .............. H04W 72/0453; H04W 16/14; H04W 76/025; H04W 48/12; H04W 52/146;
(Continued)

(56) References Cited

U.S. PATENT DOCUMENTS 6,286,104 B1 * 9/2001 Buhle ................... H04L 63/105
                  707/999.009
8,189,523 B2 * 5/2012 Barbaresi .............. H04W 28/16
                  370/230

(Continued)

FOREIGN PATENT DOCUMENTS

| CN | 103718639 A | 4/2014 |
|---|---|---|
| EP | 2695480 B1 | 2/2017 |

(Continued)

OTHER PUBLICATIONS

"Chinese Application Serial No. 201180071345.0, Response filed Jan. 13, 2017 to Office Action dated Jul. 29, 2016", W/English Claims, 13 pgs.

(Continued)

*Primary Examiner* — Brian O'Connor
(74) *Attorney, Agent, or Firm* — Schwegman Lundberg & Woessner, P.A.

(57) ABSTRACT

Systems and methods for providing opportunistic carrier aggregation to short range or low power extension carriers are generally disclosed herein. One embodiment includes data traffic offload techniques to offload data communicated in a Wireless Wide Area Network (WWAN) from a primary cell to a secondary cell. For example, the primary cell may be provided by a LTE/LTE-A base station operating in licensed spectrum, and the secondary cell may be provided by a low-power extension carrier operating in unlicensed spectrum using a LTE/LTE-A standard. The low-power extension carrier may be activated as needed to offload data transfers from the primary cell, in download-only, upload-only, and time-division LTE (TD-LTE) modes. Configurations involving multimode base stations, multi mode user equipment (UE), relay extension carriers, and remote radio equipment are also described herein, in conjunction with (Continued)

deployment of opportunistic carrier aggregation using extension carriers.

20 Claims, 5 Drawing Sheets

Related U.S. Application Data

(60) Provisional application No. 61/471,042, filed on Apr. 1, 2011.

(51) Int. Cl.

| | | |
|---|---|---|
| H04B 7/04 | (2017.01) | |
| H04B 7/06 | (2006.01) | |
| H04L 5/00 | (2006.01) | |
| H04L 12/26 | (2006.01) | |
| H04L 12/721 | (2013.01) | |
| H04L 29/06 | (2006.01) | |
| H04W 4/00 | (2018.01) | |
| H04W 24/00 | (2009.01) | |
| H04W 24/02 | (2009.01) | |
| H04W 24/10 | (2009.01) | |
| H04W 28/08 | (2009.01) | |
| H04W 48/10 | (2009.01) | |
| H04W 48/12 | (2009.01) | |
| H04W 52/02 | (2009.01) | |
| H04W 52/14 | (2009.01) | |
| H04W 52/18 | (2009.01) | |
| H04W 76/02 | (2009.01) | |
| H04W 16/14 | (2009.01) | |
| H04W 72/10 | (2009.01) | |
| H04W 92/20 | (2009.01) | |
| H04W 76/06 | (2009.01) | |
| H04W 16/32 | (2009.01) | |
| H04W 84/04 | (2009.01) | |
| H04W 88/10 | (2009.01) | |

(52) U.S. Cl.
CPC ......... *H04B 7/0632* (2013.01); *H04B 7/0639* (2013.01); *H04L 5/001* (2013.01); *H04L 5/003* (2013.01); *H04L 5/0037* (2013.01); *H04L 5/0094* (2013.01); *H04L 43/50* (2013.01); *H04L 45/70* (2013.01); *H04L 65/608* (2013.01); *H04W 4/005* (2013.01); *H04W 16/14* (2013.01); *H04W 24/00* (2013.01); *H04W 24/02* (2013.01); *H04W 24/10* (2013.01); *H04W 28/08* (2013.01); *H04W 48/10* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 76/025* (2013.01); *H04L 5/0032* (2013.01); *H04W 16/32* (2013.01); *H04W 72/10* (2013.01); *H04W 76/064* (2013.01); *H04W 84/045* (2013.01); *H04W 88/10* (2013.01); *H04W 92/20* (2013.01); *Y02B 60/50* (2013.01)

(58) Field of Classification Search
CPC ............. H04W 52/18; H04W 72/0413; H04W 72/042; H04W 24/00; H04W 24/10; H04W 52/0216; H04W 4/005; H04W 24/02; H04W 48/10; H04W 72/10; H04W 88/10; H04W 84/045; H04W 16/32; H04W 76/064; H04W 92/20; H04L 5/001; H04L 5/0094; H04L 65/608; H04L 45/70; H04L 43/50; H04L 5/003; H04L 5/0037; H04L 5/0032; H04B 7/0456; H04B 7/0632; H04B 7/0486; H04B 7/0639; Y02B 60/50

See application file for complete search history.

(56) References Cited

U.S. PATENT DOCUMENTS

| | | | |
|---|---|---|---|
| 8,638,704 B2 | 1/2014 | Gupta et al. | |
| 8,824,390 B2 | 9/2014 | Aminaka | |
| 8,861,451 B2 | 10/2014 | Tenny et al. | |
| 8,923,251 B2 | 12/2014 | Wu | |
| 9,008,671 B2 * | 4/2015 | Fodor | H04W 48/18 |
| | | | 455/443 |
| 9,288,742 B2 * | 3/2016 | Etemad | H04W 16/14 |
| 9,301,301 B2 * | 3/2016 | Aumann | H04W 16/02 |
| 2010/0173667 A1 | 7/2010 | Hui et al. | |
| 2011/0021197 A1 | 1/2011 | Ngai | |
| 2011/0222502 A1 | 9/2011 | Aminaka | |
| 2012/0243514 A1 | 9/2012 | Wu | |
| 2014/0010086 A1 | 1/2014 | Etemad et al. | |
| 2014/0043979 A1 | 2/2014 | Etemad et al. | |

FOREIGN PATENT DOCUMENTS

| | | |
|---|---|---|
| GB | 2404113 A | 1/2005 |
| KR | 1020040053858 A | 6/2004 |
| KR | 100770145 B1 | 10/2007 |
| WO | WO-2010064365 A1 | 6/2010 |
| WO | WO-2011038272 A1 | 3/2011 |
| WO | WO-2012134567 A1 | 10/2012 |

OTHER PUBLICATIONS

"Chinese Application Serial No. 201180071345.0, Response filed Apr. 24, 2017 to Office Action dated Feb. 14, 2017", w/o claims in English, 2 pgs.

"U.S. Appl. No. 13/991,712, Non Final Office Action dated Apr. 1, 2015", 16 pgs.

"U.S. Appl. No. 13/991,712, Notice of Allowance dated Oct. 14, 2015", 5 pgs.

"U.S. Appl. No. 13/991,712, Preliminary Amendment filed Jun. 5, 2011", 3 pgs.

"U.S. Appl. No. 13/991,712, Response filed Jun. 30, 2015 to Non Final Office Action dated Apr. 1, 2015", 12 pgs.

"European Application Serial No. 11862019.4, Extended European Search Report dated Sep. 8, 2014", 7 pgs.

"International Application Serial No. PCT/US2011/065628, International Preliminary Report on Patentability dated Oct. 10, 2013", 6 pgs.

"International Application Serial No. PCT/US2011/065628, International Search Report dated Apr. 10, 2012", 3 pgs.

"International Application Serial No. PCT/US2011/065628, Written Opinion dated Apr. 10, 2012", 4 pgs.

U.S. Appl. No. 13/991,712, filed Aug. 14, 2013, Opportunistic Carrier Aggregation Using Short Range Extension Carriers, U.S. Pat. No. 9,288,742.

"Chinese Application Serial No. 201180071345.0, Office Action dated Feb. 14, 2017", w/ English Translation, 25 pgs.

"Chinese Application Serial No. 201180071345.0, Office Action dated Jul. 29, 2016", W/English Claims, 11 pgs.

* cited by examiner

OPPORTUNISTIC CARRIER AGGREGATION USING SHORT RANGE EXTENSION CARRIERS

PRIORITY CLAIM

This application is a continuation of U.S. patent application Ser. No. 13/991,712, filed Aug. 14, 2013, which is a National Stage Filing under 35 U.S.C. 371 from International Patent Application Serial No. PCT/US2011/065628, filed Dec. 16, 2011, published on Oct. 4, 2012 as WO 2012/134567 A1, which claims the benefit of priority to U.S. Provisional Patent Application Ser. No. 61/471,042, filed Apr. 1, 2011, each of which is incorporated herein by reference in its entirety.

TECHNICAL FIELD

Embodiments pertain to wireless communications. Some embodiments relate to the use of wireless communication standards for wide and local area networks implementing WiMAX (e.g., a standard from the IEEE 802.16 standards family) or 3GPP Long Term Evolution (LTE)/LTE-Advanced (LTE-A) protocols.

BACKGROUND

As the use of mobile wireless devices, such as smart phones and tablet devices, becomes more ubiquitous, the demands on the limited amount of radio frequency spectrum used by those devices also increases, resulting in wireless network congestion and reduced bandwidth for devices operating in the licensed spectrum. In addition, the increased use of high bandwidth applications such as audio and video streaming can increase demands beyond the capability of the available spectrum.

Various techniques exist to offload data traffic from a Wireless Wide Area Network (WWAN) (e.g., a 4G 3GPP-LTE or WiMAX network) to secondary networks such as a Wireless Local Area Network (WL/AN) (e.g., a Wireless Fidelity (Wi-Fi) network operating according to a standard from the IEEE 802.11 family) or a Wireless Personal Area Network (WPAN) (e.g., a network operating according to a Bluetooth or an IEEE 802.15 family standard). WWAN carriers, however, generally are not provisioned for operation in unlicensed spectrum, and rely on complex device and network integration to conduct offloading of data traffic to a secondary network. For example, offloading data traffic from a 4G WWAN to a Wi-Fi WEAN may require specific multiple Radio Access Technologies multi-RAT) functionality to be programmed into the communicating devices, and might only be deployed across the same operator's 4G and managed Wi-Fi networks.

DETAILED DESCRIPTION

Figure 1:
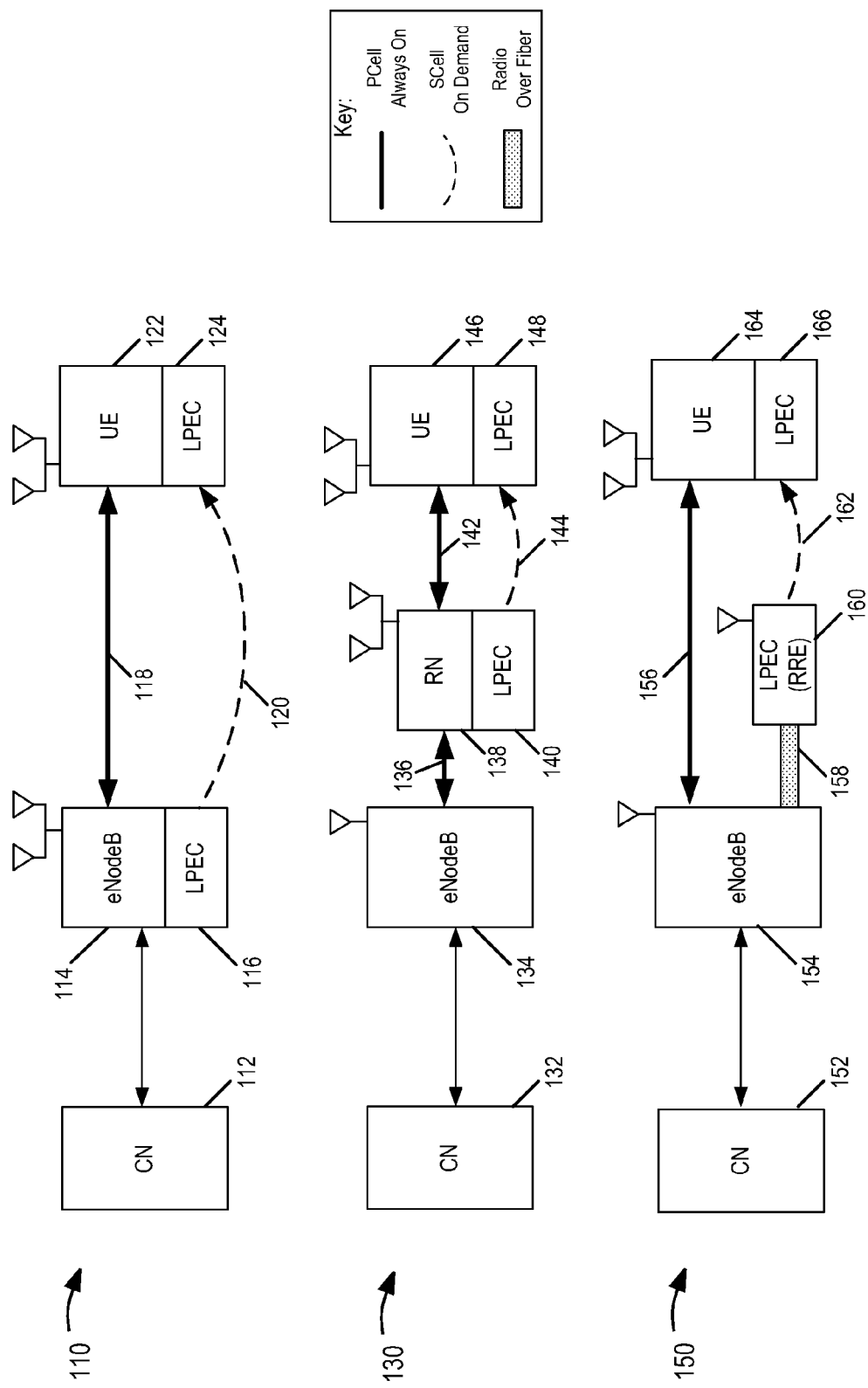
FIG. 1 illustrates a series of mobile communication frameworks used for carrier aggregation with short range extension carriers in accordance with example embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth the claims encompass all available equivalents of those claims.

The presently described techniques include various opportunistic carrier aggregation networking configurations and uses, including carrier aggregation techniques extending data transfers to licensed and unlicensed bands with the use of extension carders. For example, in one example embodiment, techniques may be implemented to allow optimized carrier aggregation with full Quality of Service (QoS) and fast scheduling capability using homogenous Radio Resource Control (RRC), Radio Link Control (RLC), and Media Access Control (MAC) protocols as defined for implementations of 3GPP LTE/LTE-A or IEEE 802.16 (WiMAX) standards. This may result in improved data rates and capacity for data transmissions, especially in networks which have limited licensed spectrum.

The embodiments described herein further provide specific techniques related to use of short range extension carriers (e.g., low-power base station nodes such as microcells, picocells, femtocells, and relay nodes), including low power LTE extension carriers operating according to a 3GPP LTE/LTE-A standard. For example, the following describes various use cases for low power extension carriers that can be opportunistically configured and used as a secondary cell (SCell) carrier aggregation configuration in conjunction with a fully configured primary carrier cell (PCell) (e.g., a primary carrier cell provided by a high-power macrocell).

In summary, carrier aggregation allows the expansion of effective bandwidth to user equipment (UE) (e.g., a mobile device) through concurrent utilization of radio resources across multiple carriers. In the present examples, use of multiple component carriers (both a PCell provided by a regular carrier and a SCell provided by an extension carrier) may be aggregated to form a larger overall available bandwidth than existent with a PCell only.

An extension or other "virtual" carrier can be distinguished from a regular or primary carrier as it is not designed to carry some of the downlink reference signals and control channels as carried by the primary carrier. An extension carrier typically serves as a carrier that is not directly accessible by UE, but is supplemental to a primary carrier. Thus, an extension carrier can be used to implement a secondary cell configured and supported by a regular and "fully configured" primary cell.

In accordance with an embodiment described herein, a radio operating in either unlicensed or licensed spectrum can be treated as an extension carrier for seamless inclusion in the operator's access network. Specifically, the mobile carrier framework can be extended by linking to an extension carrier that is opportunistically turned on, configured, and used as a SCell, thereby providing additional capacity in the data plane. Such on-demand use of an extension carrier can reduce the effective interference in the SCell, and provide the ability to offload data transfers as appropriate to the SCell.

A number of extension carrier types exist that may be used in conjunction with the presently described techniques and configurations. For example, an extension carrier may be provided by: a low power LTE carrier operating in a commonly used licensed spectrum but having a short range; an LTE-based carrier optimized and operating in special secondary bands (e.g. in millimeter wave frequencies); a low power LTE or WiMAX carrier operating in an unlicensed band; a low power radio node co-located with a relay node for a Macrocell; a low power radio node operating as a remote radio element; and other like types of extension carriers operating in licensed or unlicensed bands with any number of communication standards. While the use of low power LTE and LTE-A carrier extension nodes is disclosed in detail for the following examples, the same principles of carrier aggregation to extension nodes can be used for any number of WWAN technologies and configurations, such as a WiMAX network.

In an example deployment scenario relevant to a LTE network, a low power LTE carrier transmitter can be turned on before cell configuration, and be turned off or placed in long discontinuous transmission (DTX) mode once deactivated. The low power LTE carrier transmitter may then be activated based on Radio Resource (RRM) or Quality of Experience (QoE) measurements reported from the PCell, or other criterion, and operate as a SCell consistent with the carrier aggregation framework of LTE-A Release 10. Further, the low power LTE carrier transmitter may be configured for performing LTE wireless transmissions in an operator's licensed spectrum, or in unlicensed spectrum (e.g., in the 2.4 GHz or 5 GHz frequency blocks typically used by Wi-Fi, or in other publicly accessible radio bands).

In a further embodiment, regular carriers (i.e., fully configured and accessible primary carriers) may also be used for providing a SCell for such on demand usage. However, given the irregular and sporadic transmissions needed to provide support for a SCell, use of regular carriers may result in confusing behaviors on nearby cell selection for UEs, handover, or other measurement-based decisions. Therefore, the following example embodiments are provided with reference to a secondary low-power extension carrier, although those skilled in the art would recognize applicability of similar offloading and network management techniques to regular carriers and carrier frameworks.

FIG. 1 provides an illustration of three deployment scenarios 110, 130, 150 operating in accordance with the presently described embodiments. Scenario 110 illustrates a Pico/Femto enhanced NodeB (eNodeB) 114 operating a PCell, co-located with a low power extension carrier (LPEC) radio node 116; scenario 130 illustrates a Macrocell eNodeB 134 operating a PCell, communicating with a Relay Node (RN) 138 that is co-located with a LPEC radio node 140; and scenario 150 illustrates a Picocell eNodeB 154 operating a PCell, with a LPEC Remote Radio Element (RRE) 160 radio node.

Scenario 110 in FIG. 1, more specifically, illustrates an example 3GPP LTE system architecture in which an eNodeB 114 is connected to a core network (CN) 112 through a wired or wireless connection, for example as defined in the LTE specification. The CN 112 may include a serving gateway and a Packet Data Network (PDN) gateway. In this example, the eNodeB 114 is integrated with LPEC radio node 116, such as in a dual-mode base station configuration. The eNodeB 114 establishes the PCell network and maintains an "always on" connection 118 with UE 122 via the PCell. The LPEC radio node 116 establishes the SCell network as requested, and creates an on-demand connection 120 via the SCell network with a LPEC radio 124 integrated with the UE 122, such as in a dual-mode UE configuration.

Scenario 130 in FIG. 1 illustrates an example of another 3GPP LTE system architecture. eNodeB 134 is connected to a core network (CN) 132 through a wired or wireless connection, as previously discussed. The eNodeB 134 may be a Macrocell configured to serve a large area, such as a radius of multiple kilometers. The eNodeB 134 can facilitate a plurality of PCell connections directly or through relay nodes, with connection 136 to relay node (RN) 138 illustrated. In scenario 130, a PCell network is established through the use of an always-on connection 136 to RN 138, which in turn relays the PCell communication to UEs. As illustrated, the RN 138 is configured to relay a signal from eNodeB 134, using WWAN PCell connection 142 to UE 146. eNodeB 134 may directly serve a number of UEs with direct PCell connections, or RN 138 may serve a number of UEs with indirect PCell connections relayed with connection 136. Each relay node connected to eNodeB 134, such as RN 138 in scenario 130, establishes a PCell network to maintain an always-on connection such as WWAN PCell connection 142 with UE 146. The RN 138 as depicted is further integrated with a LPEC radio node 140 that establishes a SCell network to provide bandwidth via an on-demand connection. The SCell network can facilitate an on-demand SCell connection 144 with a LPEC radio 148 integrated with the UE 146, such as in a dual-mode UE configuration, to provide additional bandwidth or otherwise facilitate carrier aggregation functions.

Scenario 150 in FIG. 1 illustrates an example of another 3GPP LTE system architecture. eNodeB 154 is connected to a core network (CN) 152 through a wired or wireless connection, as previously discussed. The eNodeB 154 can be connected to one or a plurality of devices via a PCell network, such as the always-on SCell connection 156 created between eNodeB 154 and UE 164. Scenario 150, however, further depicts a connection between eNodeB 154 and a RRE, such as LPEC RRE 160 that is operable to establish a SCell network. The LPEC RRE 160 can be connected to the eNodeB 154 via a radio over fiber connection 158 or another type of broadband connection. The eNodeB 154 can form an always-on PCell connection 156 with a plurality of UEs such as UE 164 via the PCell network. An on-demand SCell connection 162 can be formed between LPEC RRE 160 providing the SCell network that is integrated with the PCell UE 164 and LPEC 166 radios at a device to provide additional bandwidth to the device.

Additional configuration and deployment of SCell networks may be provided by other extension carriers within the proximity of the PCell. For example, the PCell established by eNodeBs 114, 134, 154 in scenarios 110, 130, and 150 respectively may be used to configure multiple RREs or LPECs and activate SCells selectively per UE, based on the UE location in the PCell or other factors.

Scenarios 110, 130, and 150 in FIG. 1 each illustrate several example architectures in which a PCell connection is integrated with an on-demand SCell connection provided through carrier aggregation with an extension carrier. As shown, the extension carrier hardware, location, and operations may vary depending on network architecture and characteristics. Extension carriers, however, may be configured for deployment of an on-demand SCell without significant changes in other parts of an operator's network.

The scenarios and examples of FIG. 1 are not intended to be limiting, as other types of devices and configurations may be used with the presently described extension carrier techniques. For example, one embodiment includes a network configuration providing a PCell configured to communicate in a licensed band and being integrated with a SCell configured to communicate in an unlicensed band. Thus, in the example scenarios 110, 130, and 150 in FIG. 1, PCell connections 118, 136, 142, 156 may be established through radio communications in the licensed spectrum, whereas SCell connections 120, 144, 162 may be established through radio communications in the unlicensed spectrum, even though the same or substantially the same communication protocol (e.g., LTE/LTE-A) or communication standard is used to operate each of the PCell and SCell connections with UE.

FIG. 1 depicts each of the scenarios 110, 130, and 150 in the context of download extensions for a network, specifically providing additional download bandwidth for connections to UE. A similar approach can be taken for opportunistic extension of upload bandwidth for connections from UE. Thus, in each of scenarios 110, 130, 150, the LPEC cell (e.g., provided by LPEC 116, 140, 160 in scenarios 110, 130, and 150 respectively) may be established as: a download-only LPEC paired with upload communications via the PCell; an upload-only LPEC paired with download communications via the PCell; or both download and upload techniques using, for example, a Low Power Time-Division LTE (TD-LTE) carrier having separate signals for upload and download bandwidth.

As previously suggested, LPECs operating as an extension carrier may be provisioned in either licensed spectrum or unlicensed spectrum, assuming proper regulatory requirements are taken into consideration for design and operation of the extension carrier. For example, the LPEC may be configured to perform low-power LTE communications using an unlicensed band such as 2.4 GHz or 5 GHz, provided that the extension carrier and the UE support communication over such a frequency. The radio transmission/reception on both the SCell and UE side can be turned on and off and controllable by the PCell such that unnecessary interference and/or power consumption is avoided.

Moreover, with use of the configurations described herein, cross carrier scheduling and aggregation may be enabled across both licensed and unlicensed bands. In cases involving LPEC transmissions in unlicensed bands or secondary bands such as millimeter waves, special radio profile and transmission mask consideration should be taken to meet the relevant regulatory requirements. Communication may occur between the low power extension carrier and the UE in unlicensed bands, for example, with use of existing hardware configurations in both the SCell and the UE. For example, with proper radio design, there may be opportunity to reuse some of RF front end hardware typically used for Wi-Fi, when deploying LTE over unlicensed bands with LPECs.

Figure 2:
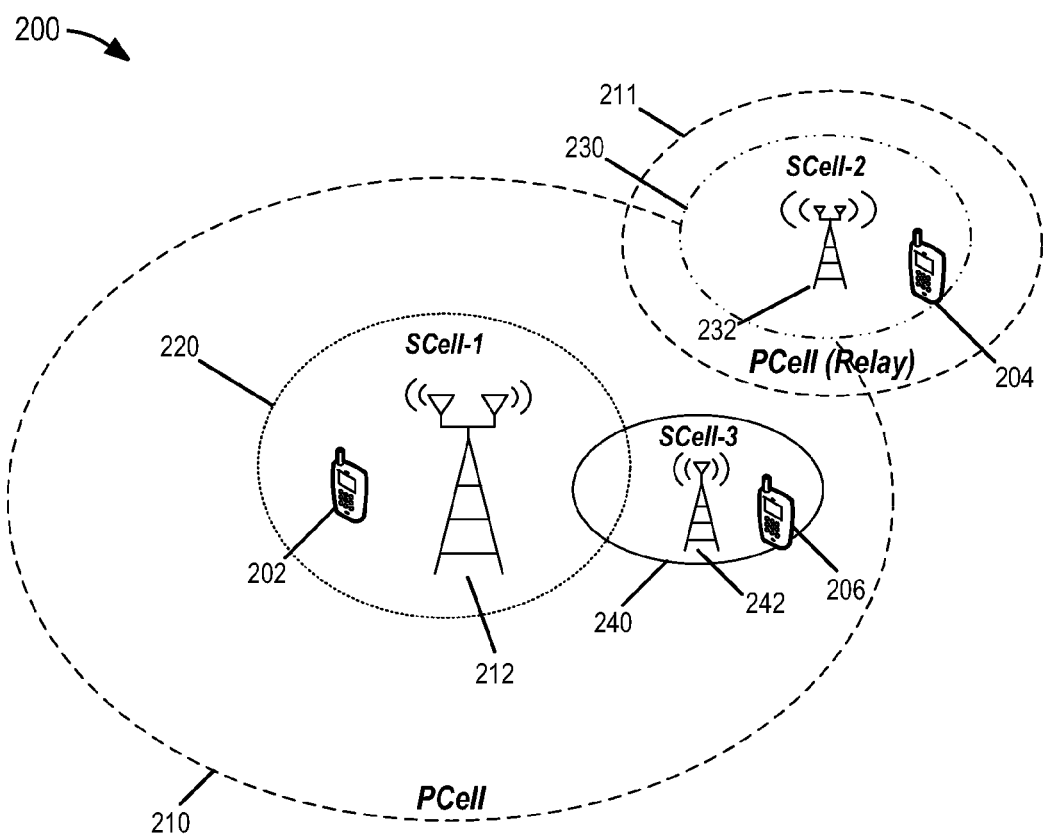
FIG. 2 illustrates carrier aggregation between a primary cell network provided by a primary carrier and a plurality of secondary cell networks provided by extension carriers according to an example embodiment.

FIG. 2 provides an illustration of a system configuration 200 supporting carrier aggregation between a primary carrier and a plurality of extension carriers according to another example embodiment. As shown, dual-mode base station 212 provides a PCell network 210 from a primary carrier, which covers a geographic area that encompasses a plurality of SCells and UEs. Each of the SCell networks, SCell-1 220, SCell-2 230, and SCell-3 240, provide a smaller coverage area than the PCell network 210 due to their low-power operations.

As depicted, SCell-1 220 is provided by an extension carrier operating from dual-mode base station 212, SCell-2 is provided by an extension carrier operating from dual-mode relay 232, and SCell-3 240 is provided by a single-mode extension carrier 242 (such as a RRE). The dual-mode relay 232 is further configured to relay the PCell (creating PCell relay network 211) to extend the coverage area of the cell network beyond the original PCell network 210.

Configuration 200 further shows various UE 202, 204, 206, operating within the PCell coverage area. Thus, UE 202 may operate with an always-on connection to PCell network 210 and an on-demand connection to SCell-1 220 through connections with dual-mode base station 212; UE 204 may operate with an always-on connection to PCell network 210 (through PCell relay network 211) and an on-demand connection to SCell-2 230 through connections with dual-mode relay 232; and UE 206 may operate with an always-on connection to PCell 210 through a connection with dual-mode base station 212, and an on-demand connection to SCell-3 240 through single-mode extension carrier 242.

Figure 3:
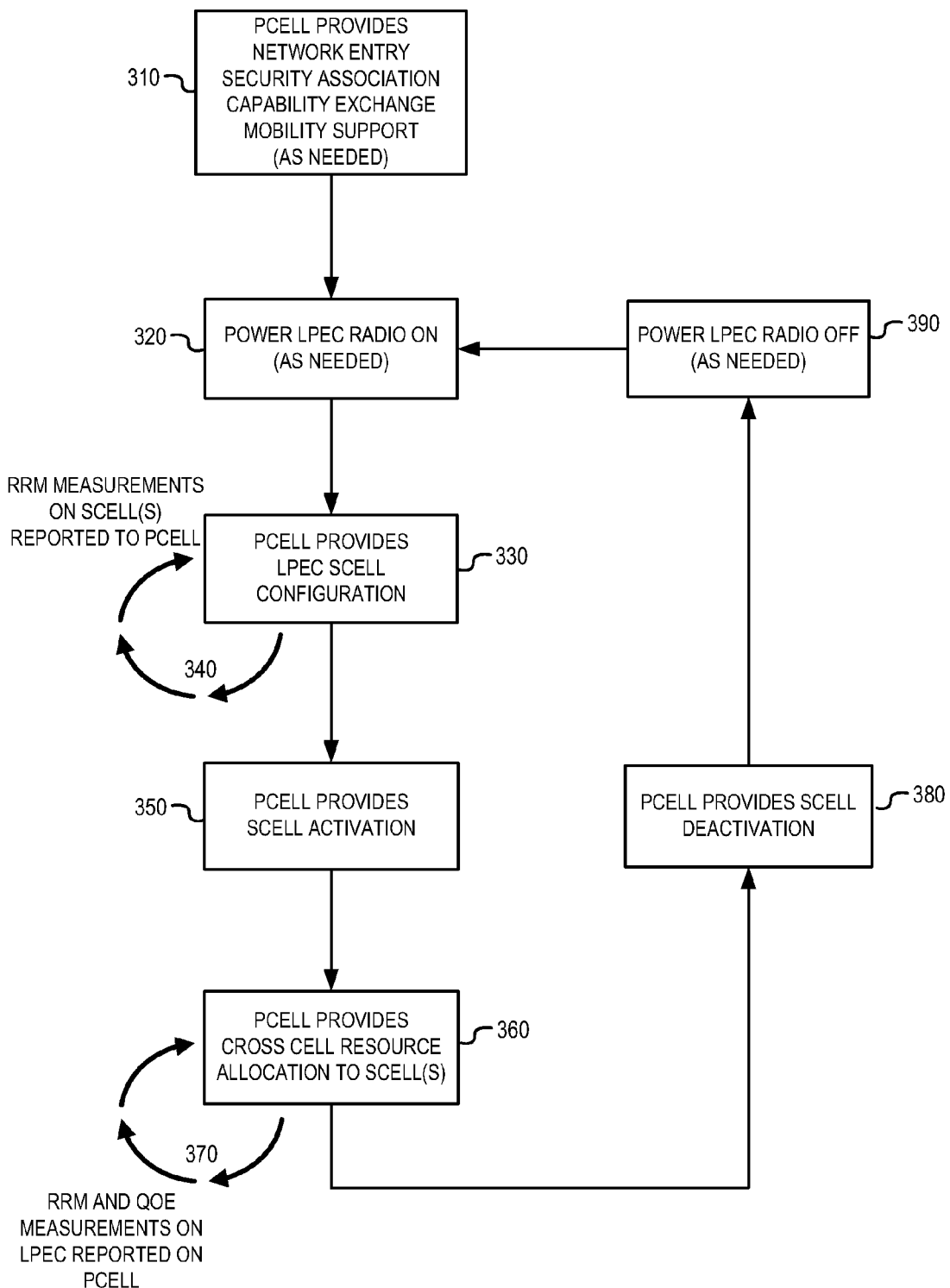
FIG. 3 is a flow diagram depicting high level procedures used to implement carrier aggregation with a short range extension carrier according to an example embodiment.

FIG. 3 provides an illustration of a series of high level procedures involved in carrier aggregation with a regular carrier operating a PCell and low power extension carrier operating a SCell according to an example embodiment. As illustrated, in operation 310, the PCell provides various configuration parameters to equipment in the network to support use of the extension carrier, including but not limited to network entry, security association, capability exchange, and mobility support, as needed.

Various procedures may be provided to enable use of the LPEC and its deployment of a SCell network. For example, in operation 320, the LPEC radio is powered on if not already powered on. In operation 330, the PCell provides the LPEC SCell with a configuration. The particular configuration deployed with the LPEC may be determined in connection with various RRM measurements on the SCells reported to the PCell as in operation 340. This is followed by the PCell providing activation of the SCell in operation 350.

Upon power on, configuration, and activation of the SCell network on the LPEC, data transmissions may occur within the SCell network. For example, this may be implemented through the PCell providing cross cell resource allocation to one or more SCell networks in operation 360, which is affected by various RRM and QoE measurements on the LPEC as reported on the PCell in operation 370. For example, if the RRM and QoE measurements are no longer favorable for the SCell, then the carrier aggregation to the SCell can be determined to be stopped. Likewise, if the RRM and QoE measurements remain more favorable in the SCell network than the PCell network, then data transfers will continue to be performed in the SCell network with use of the extension carrier.

Upon completion of the resource allocation to the SCell network, the PCell can deactivate the one or more SCell networks in operation 380. This may be followed by powering the LPEC radio off in operation 390 when use of the extension carrier is complete. Alternatively, the SCell may remain in a deactivated state (not shown) and be reactivated for data transfers without requiring a power-cycle or re-configuration.

In certain scenarios, all the traffic flows from a PCell to a certain UE may be offloaded to a SCell that is provided by an extension carrier, while in other scenarios, only selective traffic flows may be offloaded to such SCell as remaining traffic flows continue to be supported by the PCell. Further, whether a specific traffic flow is offloaded for upload or download via a SCell network may depend on the type of traffic, network conditions, the particular UE involved, and other factors which may or may not dynamically change.

Figure 4:
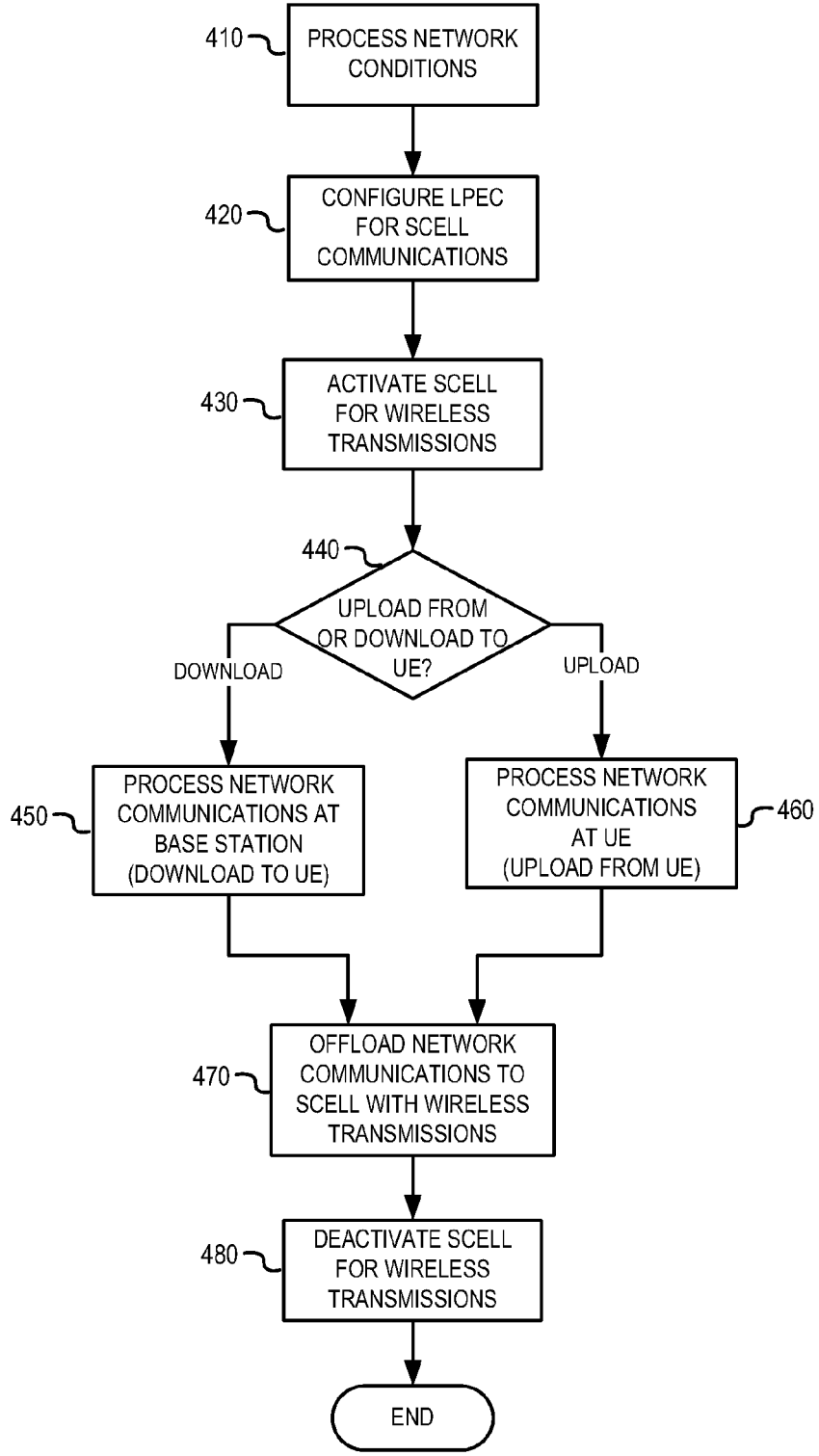
FIG. 4 is a flow diagram illustrating a method for implementing opportunistic carrier aggregation in a communication network with use of a short range extension carrier according to an example embodiment.

FIG. 4 provides a flowchart illustrating an example method 400 for performing opportunistic carrier aggregation between a primary cell (PCell) wireless network and a secondary cell (SCell) wireless network, using a series of operations performed at a communicating device (which may be either a base station or UE).

As depicted, in operation 410, network conditions are processed to determine whether to opportunistically deploy a SCell using an extension carrier. Responsive to determining that carrier aggregation to the SCell is appropriate, the SCell will be enabled. This will include configuring the LPEC for SCell communications in operation 420, and activating the SCell for one or more wireless transmissions in operation 430.

Based on whether an upload from, or a download to, a UE is occurring in decision 440, network communications will be processed at the base station or UE. In the case of an upload from the UE, network communications are processed, in operation 460, at the UE for upload, and prepared for offloading to the SCell. In the case of a download to the UE, the network communications are processed, in operation 450, at the base station, and prepared for offloading to the SCell. In operation 470, the network communications are offloaded to the cell and transmitted with one or more wireless transmissions through use of the extension carrier. Upon completion of the transmissions, the SCell is deactivated for further wireless transmissions in operation 480.

With use of the presently described techniques, opportunistic carrier aggregation providing data offloading to a secondary network may be implemented within a wireless network with minimal changes to abuse station and UE. For example, an architecture which involves a PCell configured for communication in a licensed band and a SCell configured for communication in an unlicensed band may be provided through only radio-level changes to RF communications, with no changes necessarily implemented at the MAC or PHY layers.

Data offloading may occur from the PCell to the SCell based on any number of factors, including network conditions, defined configurations, signaling, reporting values, or network and equipment specifications. These factors may be provided as feedback to network communication components within the network architecture, including but not limited to the base station, relay nodes, UE, and the like. The extent and timing of opportunistically offloading therefore may change based on network conditions or other characteristics.

The wireless networks used to facilitate communications between the devices may be provided using any number of protocols or techniques, including in some embodiments an orthogonal frequency division multiple access (OFDMA) digital modulation scheme which allows data transmissions from multiple users. Further, communication devices having a plurality of antennas may be configured to facilitate communications with one or more wireless networks using multiple-input multiple-output (MIMO) beamforming techniques.

Other network configurations may be included within the scope of the presently described network configurations and techniques. While this disclosure illustrates various carrier aggregation techniques implemented using 3GPP LTE/LTE-A standards, the techniques are equally applicable with other carrier aggregation frameworks. Likewise, although the examples of communication in unlicensed bands provided with reference to the use of 2.4 GHz and 5 GHz bands (such as those typically used in connection with a standard from the 802.11 standards family), it will be understood that communication in an unlicensed band may occur in any number of the industrial, scientific, and medical (ISM) radio bands that are reserved internationally for the use of radio frequency (RF) energy for industrial, scientific, and medical purposes, including but not limited to the 60 GHz band that is used for high bandwidth communication.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the base station (including the primary carrier, extension carrier, and variations thereof), UE, or other network transmitting node may include one or more processors and may be configured with instructions stored on a computer-readable storage device.

Figure 5:
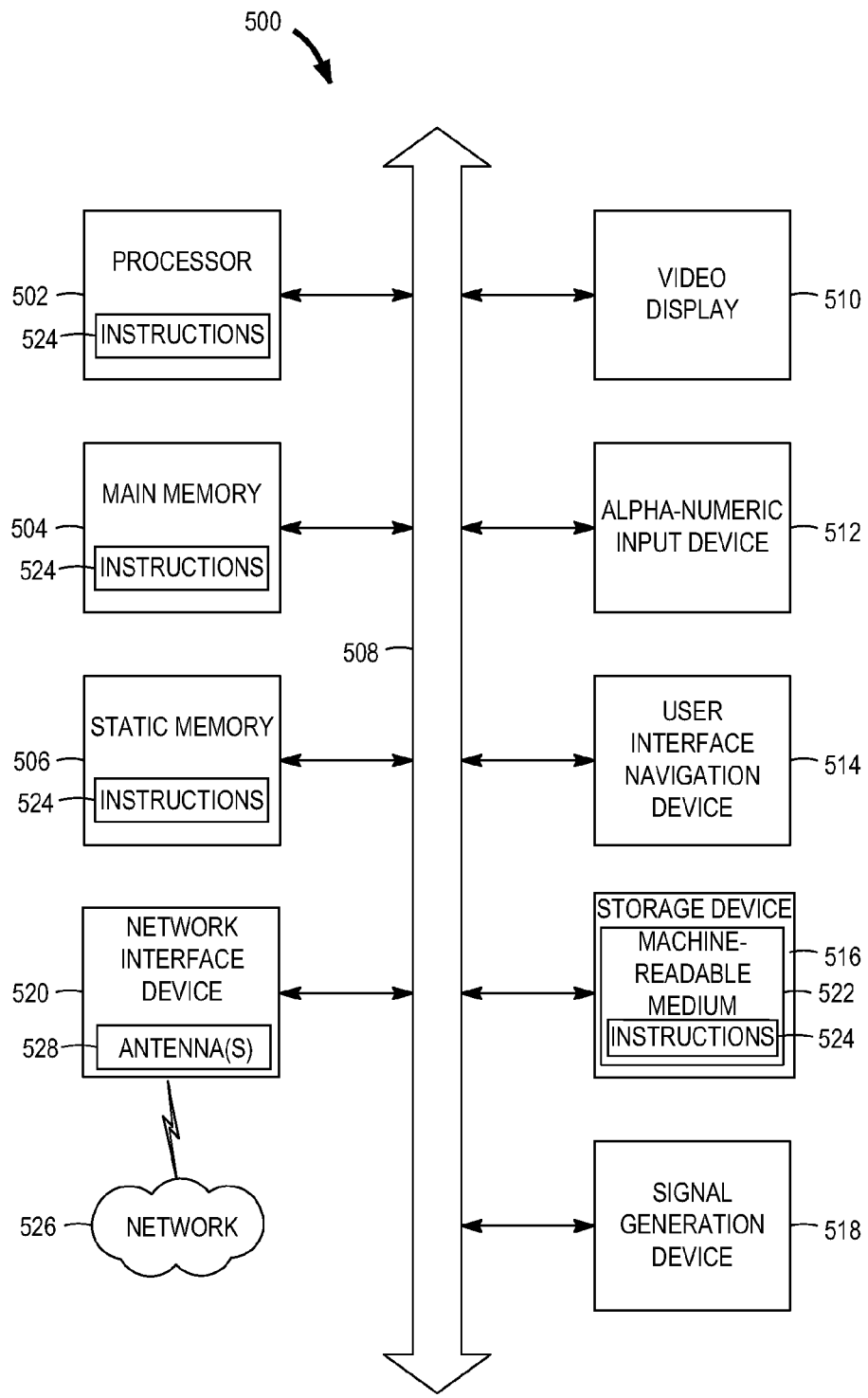
FIG. 5 illustrates a block diagram of an example machine upon which one or more embodiments can be implemented on, or used with, in conjunction with the presently described techniques and configurations.

FIG. 5 is a block diagram illustrating an example machine upon which any one or more of the methodologies herein discussed can be run. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes a processor 502 (e.g., a central processing unit (CPU), a graphics processing unit (GPU) or both), a main memory 504 and a static memory 506, which communicate with each other via a bus 508. The computer system 500 can further include a video display unit 510, an alphanumeric input device 512 (e.g., a keyboard), and a user interface (UI) navigation device 514 (e.g., a mouse) In one embodiment, the video display unit 510, input device 512 and UI navigation device 514 are a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes dual-mode base station, comprising an enhanced NodeB (eNodeB), the eNodeB arranged to provide a primary cell (PCell) network; and a short range extension carrier operably coupled to the eNodeB, the short range extension carrier arranged to provide a secondary cell (SCell) network; wherein a same network protocol is used for wireless network transmissions in each of the PCell and the SCell; and wherein data communications are opportunistically offloaded from the PCell to the SCell.

In Example 2, the subject matter of Example 1 can optionally include providing radio transmissions from each of the short range extension carrier and the eNodeB, the short range extension carrier arranged to broadcast radio transmissions from the dual-mode base station at a lower power than the eNodeB radio transmissions.

In Example 3, the subject matter of one or any combination of Examples 1-2 can optionally include wireless network communications in the PCell being transmitted with the eNodeB in a licensed band, wherein wireless network communications in the SCell are transmitted with the short range extension carrier in an unlicensed band.

In Example 4, the subject matter of one or any combination of Examples 1-3 can optionally include the same network protocol used in each of the PCell and the SCell operating according to a 3GPP Long Term Evolution (LIE) standard, a Long Term Evolution-Advanced (LIE-A) standard, or a WiMAX standard front the 802.16 standards family.

In Example 5, the subject matter of one or any combination of Examples 1-4 can optionally include the eNodeB and the short range extension carrier operably coupled to one or more transceivers arranged to perform multiple-input multiple-output (NUM) beamforming.

In Example 6, the subject matter of one or any combination of Examples 1-5 can optionally include data communications offloaded from the PCell to the SCell based on one or both of Radio Resource Management (RRM) and Quality of Experience (QoE) measurements in either or both of the PCell and SCell.

In Example 7, the subject matter of one or any combination of Examples 1-5 can optionally include the short range extension carrier operating in a mode selected from the group consisting of a download only mode, an upload only mode, and a time-division mode.

Example 8 can include, or can optionally be combined with the subject matter of one or any combination of Examples 1-7 to include, a method for opportunistic carrier aggregation between a primary cell (PCell) wireless network and a secondary cell (SCell) wireless network, comprising: configuring a low power extension carrier (LPEC) to communicate one or more wireless transmissions via the SCell; activating the LPEC for the one or more wireless transmissions via the SCell; and offloading data communications from the PCell to the SCell using the one or more wireless transmissions; wherein a same network protocol is used to conduct the wireless transmissions in each of the PCell and the SCell.

In Example 9, the subject matter of Example 8 can optionally include the wireless transmissions in the SCell being transmitted in a licensed band, wherein the wireless transmissions in the SCell are transmitted in an unlicensed hand.

In Example 10, the subject matter of one or any combination of Examples 8-9 can optionally include powering on a radio of the LPEC before configuring the LPEC to communicate the one or more wireless transmissions; and powering off the radio of the LPEC after completion of offloading the data communications from the PCell to the SCell using the one or more wireless transmissions.

In Example 11, the subject matter of one or any combination of Examples 8-10 can optionally include processing radio resource management (RRM) and Quality of Experience (QoE) measurements in either or both of the PCell and SCell, wherein offloading the data communications from the PCell to the SCell is based on the processed RRM and QoE measurements.

In Example 12, the subject matter of one or any combination of Examples 8-11 can optionally include the wireless transmissions being performed using multiple-input multiple-output (MIMO) beamforming, wherein each of the SCell and the SCell implement orthogonal frequency division multiple access (OFDMA) modulation.

Example 13 can include, or can optionally be combined with the subject matter of one or any combination of Examples 1-12 to include user equipment comprising physical-layer circuitry arranged to implement opportunistic carrier aggregation, the physical-layer circuitry comprising: a primary network interface arranged to communicate with a PCell wireless network, the PCell provided by a primary carrier; a secondary network interface arranged to communicate with a SCell wireless network, the SCell provided on demand by a short range extension carrier; wherein a same network protocol is used by the user equipment for wireless network communications with each of the PCell wireless network and SCell wireless network; and wherein data communications are opportunistically offloaded from the PCell to the SCell.

In Example 14, the subject matter of Example 13 can optionally include wireless network communications with the PCell being transmitted in a licensed band, wherein wireless network communications with the SCell are transmitted in an unlicensed band.

In Example 15, the subject matter of one or any combination of Examples 13-14 can optionally include the same network protocol used by the user equipment for wireless network communications with each of the PCell and the SCell operating according to a 3GPP Long Term Evolution (LTE) standard, a Long Term Evolution-Advanced (LTE-A) standard, or a WiMAX standard from the 802.16 standards family.

In Example 16, the subject matter of one or any combination of Examples 13-15 can optionally include the data communications being offloaded from the PCell to the SCell based on one or both of Radio Resource Management (RRM) and Quality of Experience (QoE) measurements in either or both of the PCell and SCell.

In Example 17, the subject matter of one or any combination of Examples 13-16 can optionally include the SCell being used to perform wireless network transmissions with the user equipment using a mode selected from the group consisting of: a download only mode, an upload only mode, and a time-division mode.

Example 18 can include, or can optionally be combined with the subject matter of one or any combination of Examples 1-17 to include, a system, comprising: a primary cell (SCell) network for communications with a plurality of wireless devices, the PCell provided by a base station; and a secondary cell (SCell) network for on-demand communications with the plurality of wireless devices, the SCell provided by a short range extension carrier controlled by the base station; wherein a same network protocol is used for wireless network transmissions in each of the PCell and SCell; and wherein data communications are opportunistically offloaded from the PCell to the SCell.

In Example 19, the subject matter of Example 18 can optionally include the wireless network transmissions in the PCell being transmitted in a licensed band, wherein wireless network transmissions in the SCell are transmitted in an unlicensed band.

In Example 20, the subject matter of one or any combination of Examples 18-19 can optionally include the same network protocol used in each of the PCell and the SCell operating according to a 3GPP Long Term Evolution (LTE) standard, a Long Term Evolution-Advanced (LTE-A) standard, or a WiMAX standard from the 802.16 standards family.

In Example 21, the subject matter of one or any combination of Examples 18-20 can optionally include the data communications offloaded from the PCell to the SCell based on one or both of Radio Resource Management (RRM) or Quality of Experience (QoE) measurements.

In Example 22, the subject matter of one or any combination of Examples 18-21 can optionally include the base station being a dual-mode base station comprising a NodeB and the short range extension carrier.

In Example 23, the subject matter of one or any combination of Examples 18-22 can optionally include the base station being a dual-mode relay node comprising a relay node and the short range extension carrier, wherein the relay node is in communication with a NodeB.

In Example 24, the subject matter of one or any combination of Examples 18-23 can optionally include the short range extension carrier being provided by a remote radio element in communication with the base station.

In Example 25, the subject matter of one or any combination of Examples 18-24 can optionally include the short range extension carrier operating in a mode selected from the group consisting of: a download only mode, an upload only mode, and a time-division mode.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a dual-mode base station, the apparatus comprising:
   a memory; and
   processing circuitry in communication with the memory, the processing circuitry arranged to:
      configure a primary cell (PCell) to communicate in a licensed band; and
      configure a secondary cell (SCell) to communicate over a plurality of extension carriers to support carrier aggregation with the PCell;
      configure a short range extension carrier to provide the SCell;
      provide cross carrier scheduling of the short range extension carrier;
      control activation and deactivation of the short range extension carrier;
      obtain one or more network measurements; and
      offload data from the PCell to the SCell in response to a determination made by the PCell based on the one or more network measurements.

2. The apparatus of claim 1, wherein the processing circuitry is further arranged to arrange the short range extension carrier to use a same network protocol as transmissions from the PCell.

3. The apparatus of claim 1, wherein the one or more network measurements comprise Radio Resource Management (RRM) or Quality of Experience (QoE) measurements at at least one of the PCell or SCell.

4. The apparatus of claim 3, wherein the processing circuitry is further arranged to configure the SCell dependent on the one or more network measurements.

5. The apparatus of claim 3, wherein the processing circuitry is further arranged to control carrier aggregation of the PCell and the SCell dependent on the one or more network measurements.

6. The apparatus of claim 1, wherein the processing circuitry is further arranged to configure the SCell to transmit in at least one of an unlicensed band or a mmWave band.

7. The apparatus of claim 1, wherein the processing circuitry is further arranged to configure the PCell to select traffic flows of a particular user equipment (UE) for offload from the PCell to the SCell, selection of whether to offload a particular traffic flow of the traffic flows of the particular UE dependent on at least one of a type of traffic of the particular traffic flow or the particular UE.

8. The apparatus of claim 7, wherein the processing circuitry is further arranged to configure the PCell to select all traffic flows of the particular UE to offload to the SCell.

9. The apparatus of claim 7, wherein the processing circuitry is further arranged to configure the PCell to retain at least one of the traffic flows of the particular UE and offload at least one of the traffic flows to the SCell.

10. The apparatus of claim 1, wherein the processing circuitry is further arranged to configure the PCell to select traffic flows of a particular user equipment (UE) for offload from the PCell to the SCell, selection of whether to offload a particular traffic flow of the traffic flows of the particular UE dependent on at least one of network conditions, the configuration of the SCell, signaling, reporting values or network and equipment specifications of the extension carrier.

11. The apparatus of claim 1, further comprising a plurality of short range extension carriers, each extension carrier:
operably coupled to an evolved Node B (eNB) that provides the PCell,
arranged to provide a SCell network arranged to communicate over a set of extension carriers to support carrier aggregation with the PCell,
comprising an eNB-supplied configuration,
arranged to use cross carrier scheduling provided by the eNB,
is activated and deactivated control by the eNB, and
transmissions are offloaded from the PCell to the SCell in response to a determination made by the PCell based on one or more measurements made at at least one of the PCell or at least one of the SCells associated with one of the plurality of short range extension carriers.

12. The apparatus of claim 11, wherein:
the eNB is a low power eNB,
at least one of the plurality of short range extension carriers is co-located with the eNB, and
the SCell of at least another of the plurality of short range extension carriers is provided by a low power extension carrier remote radio element radio node in communication with, and remote from, the eNB.

13. The apparatus of claim 11, wherein:
the eNB is a macrocell eNB and the SCell of at least one of the plurality of short range extension carriers is provided by a low power extension carrier radio node co-located with a relay node in communication with, and remote from, the eNB.

14. The apparatus of claim 1, wherein the eNB and the short range extension carrier are operably coupled to one or more transceivers arranged to perform multiple-input multiple-output (MIMO) beamforming during carrier aggregation.

15. The apparatus of claim 1, wherein the processing circuitry is further arranged to limit operation of the short range extension carrier to one of a download only mode, an upload only mode, or a time-division mode.

16. A non-transitory computer-readable storage medium that stores instructions for execution by one or more processors of a dual-mode base station, the one or more processors to configure the dual-mode base station to:

configure a short range extension carrier via an evolved NodeB (eNB), a primary cell (PCell) provided by the eNB and a secondary cell (SCell) provided by the short range extension carrier;
activate the short range extension carrier via the eNB;
determine whether to offload traffic flow from the PCell to the SCell in response to a determination made by the PCell based on one or more measurements at at least one of the PCell or SCell;
in response to a determination to offload the traffic flow, select at least one traffic flow of a user equipment (UE) based on at least one of: a type of traffic of the at least one traffic flow, the UE, network conditions or a configuration of the SCell; and
in response to a determination to offload transmissions from the PCell to the SCell, provide cross carrier scheduling and carrier aggregation in a licensed band and an unlicensed band for the at least one traffic flow of the UE.

17. The medium of claim 16, wherein:
the one or more measurements comprise Radio Resource Management (RRM) or Quality of Experience (QoE) measurements at at least one of the PCell or SCell, and
to at least one of:
the configuration provided from the PCell to the SCell is dependent on the one or more measurements, or
the PCell is further arranged to control carrier aggregation with the SCell dependent on the one or more measurements.

18. The medium of claim 16, wherein the one or more processors further configure the dual-mode base station to:
configure the PCell to retain at least one of the traffic flows of the particular UE and offload at least one of the traffic flows to the SCell.

19. An apparatus of a dual-mode base station, the apparatus comprising:
a memory; and
processing circuitry in communication with the memory, the processing circuitry arranged to:
configure an evolved NodeB (eNB) to provide a primary cell (PCell); and
configure a short range extension carrier to provide a secondary cell (SCell),
configure the eNB to:
activate and deactivate the short range extension carrier,
obtain measurements at at least one of the PCell or SCell and determine whether to offload traffic flow from the PCell to the SCell based on the one or more measurements,
select at least one traffic flow of a user equipment (UE) based on at least one of: a type of traffic of the at least one traffic flow, the UE, network conditions or a configuration of the SCell, and
provide cross carrier scheduling and carrier aggregation in a licensed band and an unlicensed band for the at least one traffic flow of the UE.

20. The base station of claim 19, wherein:
the one or more measurements comprise Radio Resource Management (RRM) or Quality of Experience (QoE) measurements at at least one of the PCell or SCell, and
at least one of:
the configuration provided from the PCell to the SCell is dependent on the one or more measurements, or the PCell is further arranged to control carrier aggregation with the SCell dependent on the one or more measurements.

\* \* \* \* \*